United States Patent
Zhou et al.

(10) Patent No.: US 12,509,746 B2
(45) Date of Patent: *Dec. 30, 2025

(54) METHOD FOR PREPARING HIGH-PURITY METAL LITHIUM BY VACUUM THERMAL REDUCTION METHOD

(71) Applicant: SICHUAN UNION SHINE NEW ENERGY SCI-TECH CO., LTD, Sichuan (CN)

(72) Inventors: Jun Zhou, Sichuan (CN); Guangli Zhang, Sichuan (CN); Pei Yang, Sichuan (CN); Yong Gan, Sichuan (CN)

(73) Assignee: SICHUAN UNION SHINE NEW ENERGY SCI-TECH CO., LTD, Sichuan (CN)

( * ) Notice: Subject to any disclaimer, the term of this patent is extended or adjusted under 35 U.S.C. 154(b) by 981 days.

This patent is subject to a terminal disclaimer.

(21) Appl. No.: 17/596,416

(22) PCT Filed: Sep. 17, 2020

(86) PCT No.: PCT/CN2020/115852
§ 371 (c)(1),
(2) Date: Dec. 9, 2021

(87) PCT Pub. No.: WO2021/135398
PCT Pub. Date: Jul. 8, 2021

(65) Prior Publication Data
US 2022/0307107 A1  Sep. 29, 2022

(30) Foreign Application Priority Data
Jan. 3, 2020 (CN) .......................... 202010003624.4

(51) Int. Cl.
*C22B 26/12* (2006.01)
*C22B 1/24* (2006.01)
(Continued)

(52) U.S. Cl.
CPC ................ *C22B 26/12* (2013.01); *C22B 1/24* (2013.01); *C22B 5/04* (2013.01); *C22B 5/16* (2013.01)

(58) Field of Classification Search
CPC .. C22B 1/24; C22B 26/12; C22B 5/04; C22B 5/16; F27B 17/0016; F27D 2007/066; F27D 2017/009; F27D 7/06
See application file for complete search history.

(56) References Cited

U.S. PATENT DOCUMENTS 12,173,381 B2 * 12/2024 Zhou ....................... C22B 26/22

FOREIGN PATENT DOCUMENTS

| CN | 1299884 A | 6/2001 |
| CN | 1827808 A | 9/2006 |

(Continued)

OTHER PUBLICATIONS

NPL: on-line translation of CN 1299884 A, Jun. 2001 (Year: 2001).*

(Continued)

*Primary Examiner* — Jie Yang
(74) *Attorney, Agent, or Firm* — NKL Law; Allen Xue

(57) ABSTRACT

A method for preparing a high-purity metal lithium by a vacuum thermal reduction method includes the following steps: obtaining $Li_2O \cdot (2-x)CaO$ by carrying a vacuum thermal decomposition process on a lithium-containing raw material in the presence of a refractory agent and a catalyst; mixing the obtained oxide with the fluxing agent, the catalyst and a reducing agent according to a certain ratio, and then briquetting; carrying out vacuum thermal reduction in (Continued)

a vacuum reduction furnace, and performing centrifugal sedimentation and micron ceramic dust removal on lithium vapor obtained by the thermal reduction to obtain a high-purity metal gas; and removing metal impurities from the gas by controlling a condensation temperature and a condensation speed of the gas so as to purify the lithium vapor, and obtaining a high-purity metal lithium with a rapid cooling technology.

8 Claims, 2 Drawing Sheets

(51) Int. Cl.
*C22B 5/04* (2006.01)
*C22B 5/16* (2006.01)

(56) References Cited

FOREIGN PATENT DOCUMENTS

| | | | | | |
|---|---|---|---|---|---|
| CN | 101845559 | A | | 9/2010 | |
| CN | 102560148 | A | | 7/2012 | |
| CN | 102862967 | A | * | 1/2013 | |
| CN | 108165768 | A | | 6/2018 | |
| CN | 108772407 | A | * | 11/2018 | ................ B09B 3/00 |
| CN | 109536751 | A | * | 3/2019 | ............ C04B 35/443 |
| CN | 109811145 | A | | 5/2019 | |
| CN | 110129587 | A | | 8/2019 | |
| CN | 111057850 | A | | 4/2020 | |
| JP | 2016172845 | A | * | 9/2016 | |
| RU | 2449034 | C1 | | 4/2012 | |

OTHER PUBLICATIONS

NPL: on-line translation of JP 2016172845 A, Sep. 2016 (Year: 2016).*

NPL: on-line translation of CN 102862967 A, Jan. 2013 (Year: 2013).*

NPL: on-line translation of CN 109536751 A, Mar. 2019 (Year: 2019).*

NPL: on-line translation of CN 108772407 A, Nov. 2018 (Year: 2018).*

* cited by examiner

METHOD FOR PREPARING HIGH-PURITY METAL LITHIUM BY VACUUM THERMAL REDUCTION METHOD

TECHNICAL FIELD

The present invention belongs to the technical field of light metal preparation, relates to a method for extracting and purifying a high-purity metal lithium, and particularly relates to a method for preparing a high-purity metal lithium by a vacuum thermal reduction method.

BACKGROUND

A metal lithium atom has an atomic number of 3, an atomic nucleus consists of three protons and four neutrons, three electrons are around the nucleus and there are two electrons on a K electron shell which is structurally $1S^22S^1$. Lithium is very reactive chemically, and is capable of reacting with a variety of elements to form important compounds and solid solutions. For the formed alloy, for example, a magnesium-lithium alloy is a hexagonal close packed lattice or a body centered cubic lattice and has a processability; the metal lithium may react with $H_2O$, $O_2$, Na and $CO_2$ in the air, which leads to difficulty to obtain the pure lithium.

The metal lithium has a melting point as 180.54° C. and a boiling point as 1,327±10° C. A vapor pressure of the pure metal lithium is 390.6 Pa at 800° C., so that the lithium obtained by reduction is kept in a metal lithium vapor state, and may be possibly applied during the high vacuum filtration to remove the carried dust.

Saturated vapor pressures of such metals as Li, K, Na, Ca and Mg differ from the saturated vapor pressure of the metal lithium. Li purity can reach the national standard by controlling condensation and cooling temperature speed gradients and partially separating K, Na, Ca and Mg.

For the time being, a lithium chloride-potassium chloride molten-salt synthesis by high temperature electrolysis is an exclusive method for producing the lithium in industry. The method has the disadvantages that the fixed asset investment is huge, the lithium density is only 0.53 g/cm³, the metal surface is easily exposed, volatilization loss is easily caused during electrolysis, smelting and refining, the yield is rather low, the investment in environmental protection for chlorine salt electrolysis is huge, chlorine is produced, environmental protection is uneasily solved, the manufacture cost is high, K, Na and Mg contents of electrolytic lithium are high, and separation is rather difficult.

In addition, lithium salts including carbonate and nitrate have a low melting point and a low decomposition rate, are in a liquid state during the thermal decomposition and are uneasily controlled in the industry. According to the past data reports, the metal lithium obtained in the metal reduction has not high purity and reduction rate, oxides have a strong corrosivity, and equipment materials are easily damaged, so that the industrial production is more difficult.

With a variety of excellent properties and an irreplaceability, the metal lithium has been applied to various fields such as atomic energy industry, thermonuclear reaction, intercontinental missile and artificial satellite, and a usage amount of metal lithium is 500-1,000 t in a nuclear fusion reactor; Lithium alloy has been applied extensively in an application field. At present, the magnesium-lithium alloy is the lightest structural material in the world. Lithium, as an ideal battery material, has been applied extensively, and has an irreplaceable effect in many fields such as high technology, national defense and aerospace. Hence, production expansion is necessary to lower the lithium production cost.

SUMMARY

According to the above technical problem, the present invention provides a new method for preparing a high-purity metal lithium by a vacuum thermal reduction method. A gaseous phase of a reducing substance is convenient for purification due to the fact that raw materials applied for the method have extensive sources and low prices. With small fixed asset investment, high yield and low manufacture cost, the high-purity metal lithium can be continuously and automatically produced by the vacuum thermal reduction method.

To achieve the above objectives, the specific technical solution of the present invention is as follows:

A method for preparing a high-purity metal lithium by a vacuum thermal reduction method, comprising the following steps:

1) mixing and then briquetting a lithium-containing raw material, a refractory agent and a catalyst under pressure; a briquetted mixture is charged into an industrial tube furnace for thermal decomposition, the sublimated and condensed catalyst is recycled, and an unsaturated composite oxide is generated by lithium oxide and a refractory agent.

Preferably, the industrial tube furnace has a vapor-deposited nitrocarbon compound crucible.

The lithium-containing raw material is carbonate, nitrate, sulfate, silicate or lithium-containing sulfide; the refractory agent is CaO, $Al_2O_3$, or a mixture of CaO and $Al_2O_3$, and $Al_2O_3$ is industrial aluminium oxide; the catalyst is $Sb_2O_3$ or $Bi_2O_3$.

CaO is prepared by calcining $CaCO_3$ having an impurity content (K+Na)≤0.05%, Si≤1% and Mg≤0.5%, or may be prepared by a chemical precipitation method.

Antimony and bismuth oxides in the catalyst do not participate in chemical reactions. The added antimonous oxide and bismuth oxide only absorb liquid lithium carbonate, so that the liquid globules of the lithium carbonate cannot get bigger, which is beneficial for thermal decomposition of the lithium carbonate, that is, a thermal decomposition surface area of the lithium carbonate increases; after decomposition, the antimonous oxide and the bismuth oxide will leave away from a product through vaporization and sublimation, a calcium oxide addition will be lowered, and a unit production capacity will be increased. A reaction temperature may be lowered, main effects may be increased due to a reaction interface area, a reaction speed may be improved, a product quality is not affected, and a decomposition rate may be improved by 12-15% under the same conditions.

Preferably, a mass ratio of the lithium-containing raw material to the refractory agent to the catalyst is 32-40:58-67:1-3. A vacuum degree in a vacuum reaction furnace for the thermally decomposed high-temperature steel is 10-20 pa, and a temperature is 600-1300° C.

The lithium-containing raw material, the refractory agent and the catalyst in step 1) are necessarily ground to be 40-100 μm in a ball mill before being mixed; each briquette is required to be of an almond shape, at a weight of 25-35 g/Nr., a pressure briquetting condition is 35-45 Mpa, a thermal decomposition temperature is 600-1,300° C., and a decomposition ratio reaches 99% or above.

2) The unsaturated composite oxide generated in step 1), the reducing agent and a fluxing agent are respectively crushed and ball-milled, and then briquetted. A granularity is 40-100 µm after ball-milling thereof; the briquetting conditions include: briquetting into an almond shape at a weight of 25-35 g/Nr. at 30-45 Mpa.

3) The briquettes in step 2) are charged into a vacuum reaction furnace made from high temperature steel for vacuum reduction, and at this time, a reduction product is lithium vapor which has dust carrying some reducing materials and a small amount of metal impurities that may be reduced.

The reducing agent is high silicon iron, aluminium powder having an Al content being more than or equal to 99 wt %, aluminium powder having an activity being more than 70 wt % and a granularity being less than 8 µm, or aluminum silicon powder or carbon powder having an Al—Si content being more than or equal to 98%; the fluxing agent is $CaF_2$ having a purity being 97.5%.

Preferably, a mass ratio of the unsaturated composite oxide to the reducing agent to the fluxing agent is 79-85: 12-20:1-3.

For an industrial heat-resistant tube furnace for thermal reduction, a vacuum degree is 1-15 pa, a temperature is 800-1,300° C., and thermal reduction time is 8-12 h.

4) A lithium vapor carrying solid materials in step 3) passes through a centrifugal filter in a dust chamber, and then enters a first condensing chamber, and the temperatures of a centrifugal separator and the first condensing chamber are controlled to be 700-800° C. using a gas at an airflow velocity of 1.2-1.8 m/sec; the gas carrying 98% of more than 20 µm solid particles is removed while passing through the first condensing chamber, more than 99.95% of carried dust is purified when the gas passes through 0.5 µm micron ceramic filter, and an outlet temperature is controlled to be 650-700° C.

5) The purified pure lithium vapor passes through a second condensing chamber of the quenching device, a cooling liquid at below −100° C. is thermally exchanged with the metal gas on the outer layer of a condenser in the second condensing chamber, and the gas is sharply cooled to 50-80° C., so that the metal gas is condensed as a metal lithium in a condensed state.

The quenching temperature control device comprises a reaction zone, a dust chamber, the first condensing chamber, the second condensing chamber, and a slag discharge hole of the dust chamber and a vacuum tube, and the reaction zone thereof is in communication with the duct chamber; a centrifugal separator is arranged in the dust chamber, a lower end of which is provided with a funnel; a lower end of one side of the funnel is provided with the first heating zone inlet, and the slag discharge hole of the dust chamber is defined at the bottom of the funnel; an upper end of one side of the dust chamber is provided with the first heating zone outlet, the top of the dust chamber is provided with the first condensing chamber, a the second heating zone outlet is defined at an upper end of a connection between the first condensing chamber and the dust chamber and a ceramic micron filter is arranged in the first condensing chamber; the first condensing chamber is in communication with the second condensing chamber; a second heating zone inlet is defined in a connection with the second condensing chamber in the first condensing chamber; the vacuum tube is arranged on a connection with the first condensing chamber in the second condensing chamber, and a cooling liquid inlet and a cooling air inlet as well as the cooling liquid outlet and the cooling air outlet are respectively defined at both sides of the second condensing chamber.

The first condensing chamber and the second condensing chamber are double-casing coolers; in the second condensing chamber, a gas velocity in the center of the cooler is 1.5-4 m/sec, and the ratio of the cooling area to the metal of the condensate phase is 0.4-0.7 $dm^3/kg$.

The dust containing certain solid materials contains other metal impurities that are reduced, is centrifugally deposited and filtrated by a device made from a micron ceramic composite material through centrifugation; other metal impurities are separated from condensed lithium to obtain the high-purity lithium vapor by virtue of controlling airflow velocity, cooling speed, and cooling and condensation temperature gradients. For the metal lithium in the condensed state obtained by sharp cooling, a lithium yield is higher than 98.5%, and a lithium content in the slag is lower than 0.04%.

6) The metal lithium in the condensed state is smelted with the flux and distilled in a pit furnace to obtain the high-purity lithium under the protection of Ar.

The high-purity metal lithium after being refined is subject to ingot casting to obtain the lithium having a purity being 99.0-99.99 wt %.

The present invention has the following positive effects below:

(I) For the lithium produced by a vacuum thermal reduction method, a gaseous phase of a reducing substance is convenient for purification due to the fact that raw materials have extensive sources and low prices the fixed asset investment is small, the manufacture cost is low, and industrialization is easily realized.

(II) The difficulty of uneasiness to decompose a liquid phase from the thermal decomposition is solved, and decomposition rate and high thermal reduction rate are high.

(III) The reaction furnaces for thermal decomposition and thermal reduction resist against high temperature, corrosion and wear, have a long life, and make the best of heat during the reduction reaction for gas-solid separation and purification, so that the metal lithium is purified; the product has high-purity and yield, a small fixed investment, a low manufacture cost, a good economic benefit and is capable of realizing good economic benefits, and thus can be produced massively.

Figure 1:
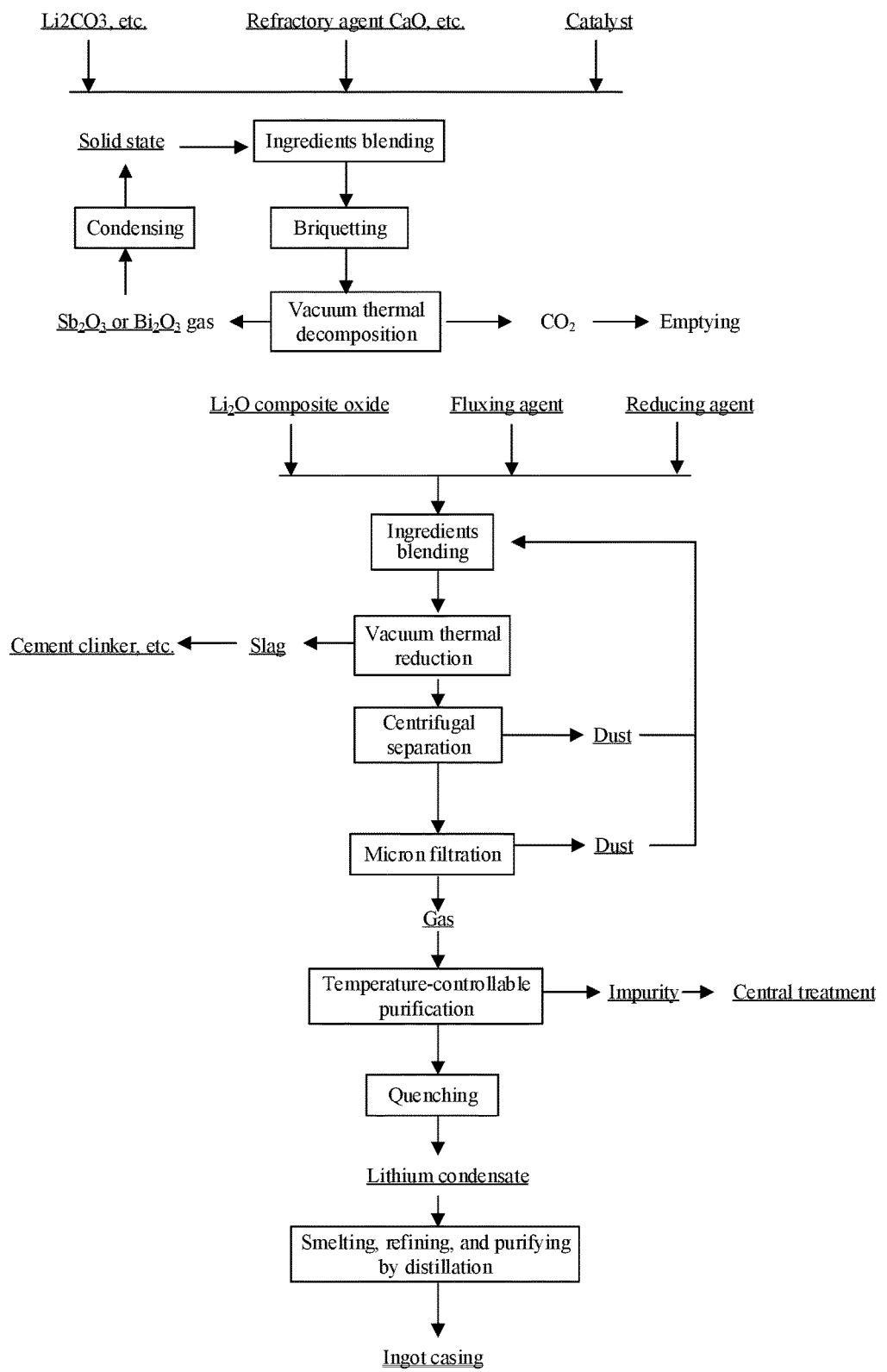
FIG. 1 is a schematic diagram for a process flow of preparing a high-purity metal lithium by a vacuum thermal reduction method.
Figure 2:
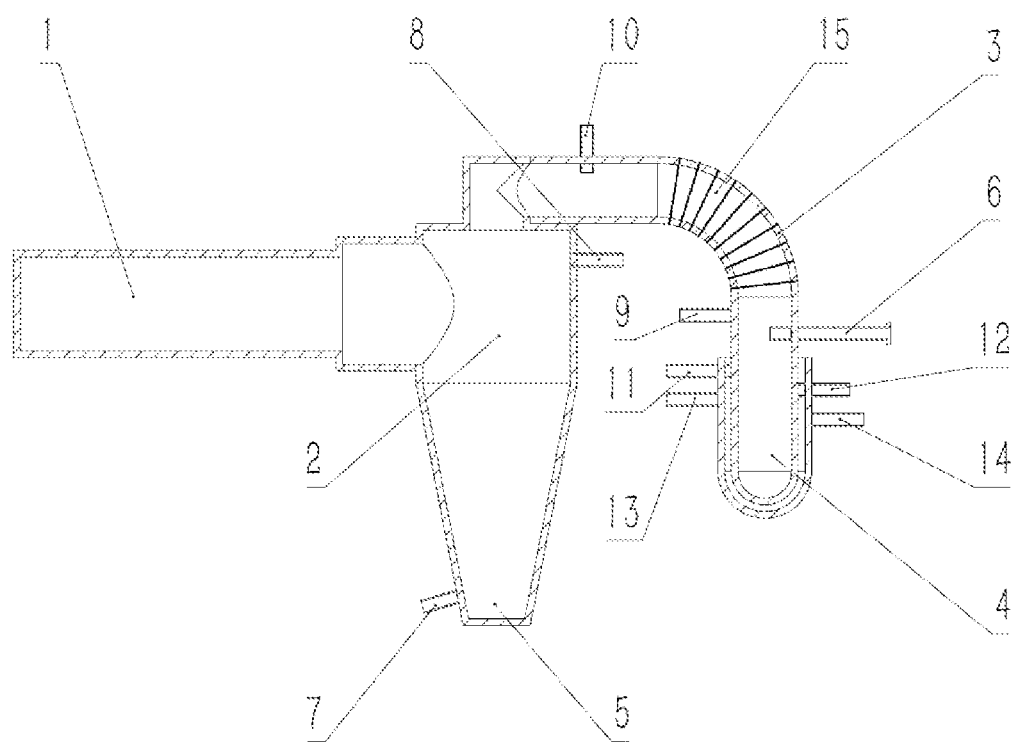
FIG. 2 is a structural diagram of a quenching device provided by the present invention.

In which, 1—reaction zone, 2—dust chamber, 3—first condensing chamber, 4—second condensing chamber, 5—slag discharge hole of dust chamber, 6—vacuum tube, 7—first heating zone inlet, 8—first heating zone outlet, 9—second heating zone inlet, 10—second heating zone outlet, 11—cooling liquid outlet, 12—cooling liquid inlet, 13—cooling air inlet, 14—cooling air outlet, and 15—ceramic micron filter.

DESCRIPTION OF EMBODIMENTS

The present invention will be further described in detail in combination with specific implementations for the purpose of clear understanding of the objectives, technical solutions and advantages of the present invention, but it shall not be understood that the scope of the above subject of the present invention is only limited to the following embodiments.

The quenching device applied in the following embodiments comprises a reaction zone, a dust chamber, a first condensing chamber, a second condensing chamber, a slag discharge hole of the dust chamber and a vacuum tube, and the reaction zone thereof is in communication with the duct chamber; a centrifugal separator is arranged in the dust chamber, a lower end of which is provided with a funnel; a lower end of one side of the funnel is provided with a first heating zone inlet, and the slag discharge hole of the dust chamber is defined at the bottom of the funnel; an upper end of one side of the dust chamber is provided with the first heating zone outlet, the top of the dust chamber is provided with the first condensing chamber, a second heating zone outlet is defined at an upper end of a connection between the first condensing chamber and the dust chamber and a ceramic micron filter is arranged in the first condensing chamber; the first condensing chamber is in communication with the second condensing chamber; a second heating zone inlet is defined on a connection with the second condensing chamber in the first condensing chamber; and the vacuum tube is arranged on a connection with the first condensing chamber in the second condensing chamber, and a cooling liquid inlet and a cooling air inlet as well as a cooling liquid outlet and a cooling air outlet are respectively defined at both sides of the second condensing chamber.

The first condensing chamber and the second condensing chamber are double-casing coolers; in the second condensing chamber, a gas velocity in the center of the cooler is 1.5-4 m/sec, and the ratio of the cooling area to the metal of the condensate phase is 0.4-0.7 $dm^3$/kg. % recited in the following embodiments shows wt % thereof, unless particularly stated.

Embodiment 1

1) Raw materials are weighed in proportion, wherein a granularity of lithium carbonate is 89 μm, and a granularity of calcium oxide is 74 μm; the lithium carbonate, a refractory agent CaO and a catalyst $Sb_2O_3$ are mixed in a molar ratio of 1:1.6:0.4, and briquetted under the pressure of 35 Mpa; each briquette is 28 g, and is of an almond shape. The prepared briquettes are charged into a φ330 mm*3,300 mm industrial tube furnace with a vapor-deposited nitrocarbon compound crucible for thermal decomposition, the sublimated and condensed catalyst may be recycled, and an unsaturated composite oxide is generated by lithium oxide and a refractory agent. A vacuum degree of the industrial tube furnace is 10 pa, and a temperature is 860° C. High temperature decomposition time is 5 h, a decomposition rate of the lithium carbonate decomposed into lithium oxide is 99.2%, and a lithium yield reaches 99.5%.

2) The unsaturated composite oxide formed by the lithium oxide obtained in step 1) and the refractory agent, a silicon iron and $CaF_2$ are respectively crushed and ball-milled till a granularity is 60 μm, mixed according to a mass ratio of 81:17:2, and pressed into briquettes at a weight of 28 g/Nr. under 30 Mpa.

3) The briquettes in step 2) are charged into a φ330 mm*3,300 mm industrial heat-resistant tube furnace for vacuum reduction, wherein a vacuum degree is 3 pa and a temperature is 1,200° C. in the furnace; and at this time, a reduction product is in a gaseous state and carries solid materials; and a lithium reduction is 99%.

4) The gas carrying the solid materials passes through a centrifugal separator in the dust chamber in a temperature control device, and then through the first condensing chamber, wherein the first condensing chamber has a sandwich; and the temperatures of the centrifugal separator and the first condensing chamber are controlled to be 750° C. with the gas at an airflow velocity of 1.5 m/sec; the gas carrying 98% of more than 20 μm solid particles is removed while passing through the first condensing chamber, more than 99.95% of carried dust is purified when the gas passes through 0.5 μm micron ceramic filter, and an outlet temperature is controlled to be 680° C.

5) The purified pure metal gas passes through the second condensing chamber of the quenching device; when a temperature of an inner layer of a double-casing cooler of the second condensing chamber is controlled to be 60° C., a low temperature cooling liquid below −110° C. is thermally exchanged with a metal gas on an outer layer; heat is transferred to an inner wall from a center of the cooler by a gas at 3 m/sec, and the cooling area is 0.65 $dm^3$/kg, so that the metal gas may be rapidly condensed as the condensed phase of the alloy.

6) A lithium metal raw ingot having a purity being 99% is obtained by flux smelting and refining of the metal lithium in a condensed phase in a pit furnace under the protection of Ar.

7) The lithium metal raw ingot is separated by distillation; a lower temperature of a distiller is controlled to be 550° C., a middle temperature controlled to be 450° C., and an upper temperature controlled to be 70° C.; impurities with a high melting point are removed from a lower part, including Fe, Ni, Co, Si and Ca; and metal impurities with a low melting point are removed from an upper part, including k and Na, and an Li metal cast ingot is discharged from a middle part.

A chemical component test (ICP test) is carried out for commodities obtained by ingot casting after distillation, and the chemical component test results (wt %) of the lithium ingot are seen in the table below.

| Li | K | Na | Ca | Fe | Si | Al |
|---|---|---|---|---|---|---|
| 99.991 | 0.0004 | 0.0009 | 0.0005 | 0.0005 | 0.0005 | 0.0005 |

| Ni | Cu | Mg | Cl− | N | Pb | |
|---|---|---|---|---|---|---|
| 0.0004 | 0.0005 | 0.0005 | 0.0008 | 0.003 | 0.0005 | |

As can be seen from Embodiment 1, the pure lithium having a purity of 99.99% prepared by the present invention by virtue of the method is applicable to more pure lithium demand fields.

Embodiment 2

1) Raw materials are weighed in proportion, wherein the granularity of lithium carbonate is 80 μm, and the granularity of calcium oxide is 65 μm; the lithium carbonate, a refractory agent CaO and a catalyst $Sb_2O_3$ are mixed in a molar ratio of 1:1.6:0.4, and briquetted under the pressure of 40 Mpa; each briquette is 28 g, and is of an almond shape. The prepared briquettes are charged into a φ330 mm*3,300 mm industrial tube furnace with a vapor-deposited nitrocarbon compound crucible for thermal decomposition, the sublimated and condensed catalyst may be recycled, and an unsaturated composite oxide is generated by lithium oxide and a refractory agent. A vacuum degree of the industrial tube furnace is 10 pa, and a temperature is 880° C. High temperature decomposition time is 5 h, a decomposition rate of the lithium carbonate decomposed into lithium oxide is 99.3%, and a lithium yield reaches 99.4%.

2) The unsaturated composite oxide formed by the lithium oxide obtained in step 1) and the refractory agent, a silicon iron and $CaF_2$ are respectively crushed and ball-milled till a granularity is 60 μm, mixed according to the mass ratio of 83:15:2, and pressed into briquettes at a weight of 28 g/Nr. under 35 Mpa.

3) The briquettes in step 2) are charged into a φ330 mm*3,300 mm industrial heat-resistant tube furnace, and the vacuum degree is controlled to be 3 pa and a temperature to be 1,200° C. in the furnace; and at this time, a reduction product is in a gaseous state and carries solid materials, and a lithium reduction is 99.1%.

4) The gas carrying the solid materials passes through a centrifugal separator in the dust chamber in a temperature control device, and then through the first condensing chamber, wherein the first condensing chamber has a sandwich; and the temperatures of the centrifugal separator and the first condensing chamber are controlled to be 780° C. with the gas at an airflow velocity of 1.5 m/sec; and the gas carrying 98% of more than 20 μm solid particles is removed while passing through the first condensing chamber, more than 99.95% of carried dust is purified when the gas passes through 0.5 μm micron ceramic filter, and an outlet temperature is controlled to be 690° C.

5) The purified pure metal gas passes through the second condensing chamber of the quenching device; when a temperature of an inner layer of a double-casing cooler of the second condensing chamber is controlled to be 70° C., a low temperature cooling liquid below −110° C. is thermally exchanged with a metal gas on an outer layer; heat is transferred to an inner wall from a center of the cooler by a gas at 2.9 m/sec, and the cooling area is 0.60 dm$^3$/kg, so that the metal gas may be rapidly condensed as the condensed phase of the alloy.

6) A lithium metal raw ingot having a purity being 99% is obtained by flux smelting and refining of the metal lithium in a condensed phase in a pit furnace under the protection of Ar.

7) The lithium metal raw ingot is separated by distillation; a lower temperature of a distiller is controlled to be 580° C., a middle temperature controlled to be 480° C., and an upper temperature controlled to be 80° C.; impurities with a high melting point are removed from a lower part, including Fe, Ni, Co, Si and Ca; metal impurities with a low melting point are removed from an upper part, including k, Na, and an Li metal cast ingot is discharged from a middle part.

A chemical component test (ICP test) is carried out for commodities obtained by ingot casting after distillation, and the chemical component test results of the obtained lithium ingot are seen in the table below.

| Li | K | Na | Ca | Fe | Si | Al |
|---|---|---|---|---|---|---|
| 99.991 | 0.0005 | 0.0008 | 0.0005 | 0.0005 | 0.0004 | 0.0004 |

| Ni | Cu | Mg | Cl- | N | Pb |
|---|---|---|---|---|---|
| 0.0004 | 0.0005 | 0.0005 | 0.0009 | 0.0031 | 0.0005 |

Embodiment 3

1) Raw materials are weighed in proportion, wherein the granularity of lithium carbonate is 76 μm, and the granularity of calcium oxide is 66 μm; the lithium carbonate, CaO and a catalyst $Sb_2O_3$ are mixed in a molar ratio of 1:1.6:0.4, and briquetted under the pressure of 40 Mpa; each briquette is 28 g, and is of an almond shape. The prepared briquettes are charged into a φ330 mm*3,300 mm industrial tube furnace with the vapor-deposited nitrocarbon compound crucible for thermal decomposition, the sublimated and condensed catalyst is recycled, and an unsaturated composite oxide is generated by lithium oxide and a refractory agent. A vacuum degree of the industrial tube furnace is 10 pa, and a temperature is 880° C. High temperature decomposition time is 5 h, a decomposition rate of the lithium carbonate decomposed into lithium oxide is 99.3%, and a lithium yield reaches 99.3%.

2) The unsaturated composite oxide formed by the lithium oxide obtained in step 1) and the refractory agent, a silicon iron and $CaF_2$ are respectively crushed and ball-milled till a granularity is mixed according to a mass ratio of 82:16:2, and pressed into briquettes at a weight of 32 g/Nr. under 42 Mpa.

3) The briquettes in step 2) are charged into a φ330 mm*3,300 mm industrial heat-resistant tube furnace for vacuum reduction; a vacuum degree is controlled to be 3 pa, and temperature to be 1,200° C. in the furnace, at the time, a reduction product is in a gaseous state and carries solid materials, and a lithium reduction is 99.1%.

4) The gas carrying the solid materials passes through a centrifugal filter in the dust chamber in a temperature control device, and then through a first condensing chamber, wherein the first condensing chamber has a sandwich; and the temperatures of the centrifugal separator and the first condensing chamber are controlled to be 760° C. with the gas at an airflow velocity of 1.5 m/sec. the gas carrying 98% of more than 20 μm solid particles is removed while passing through the first condensing chamber, more than 99.95% of carried dust is purified when the gas passes through 0.5 μm micron ceramic filter, and an outlet temperature is controlled to be 680° C.

5) The purified pure metal gas passes through the second condensing chamber of the quenching device; when the temperature of an inner layer of a double-casing cooler of the second condensing chamber is controlled to be 65° C., a low temperature cooling liquid below −105° C. is thermally exchanged with a metal gas on an outer layer; heat is transferred to an inner wall from a center of the cooler by a gas at 2.9 m/sec, and a cooling area is 0.60 dm$^3$/kg, so that the metal gas may be rapidly condensed as the condensed phase of the alloy.

6) A lithium metal raw ingot having a purity being 99% is obtained by flux smelting and refining of the metal lithium in the condensed phase in a pit furnace under the protection of Ar.

7) The lithium metal raw ingot is separated by distillation; a lower temperature of a distiller is controlled to be 560° C., a middle temperature controlled to be 460° C., and an upper temperature controlled to be 70° C.; impurities with a high melting point are removed from a lower part, including Fe, Ni, Co, Si and Ca; metal impurities with a low melting point are removed from an upper part, including k, Na, and an Li metal cast ingot is discharged from a middle part.

A chemical component test (ICP test) is carried out for commodities obtained by ingot casting after distillation, and the chemical component test results of the lithium ingot are seen in the table below.

| Li | K | Na | Ca | Fe | Si | Al |
|---|---|---|---|---|---|---|
| 99.955 | 0.0005 | 0.009 | 0.008 | 0.002 | 0.004 | 0.0005 |
| Ni | Cu | Mg | Cl- | N | Pb | |
| 0.0009 | 0.0005 | 0.0049 | 0.0048 | 0.009 | 0.0009 | |

Embodiment 4

With the granularity of lithium carbonate as 89 μm and the granularity of calcium oxide as 74 μm, the lithium carbonate, CaO and antimonous oxide are mixed in a molar ratio of 1:1.6:0.4, and then briquetted; and a briquetting pressure is 35 MPa, and each briquette is 28 g and is of an elliptical shape. The briquetted substance is charged into a φ330 mm*3,300 mm industrial tube furnace with the vapor-deposited nitrocarbon compound crucible for thermal decomposition, wherein a thermal decomposition temperature is 860° C., a vacuum degree is 10 Pa, high temperature decomposition time is 5 h, and a thermal decomposition rate is 99.2%. The remaining preparation steps are the same as those in Embodiment 1; upon the test, the lithium purity is 99.99% in a commodity obtained by ingot casting after refining.

Embodiment 5

With the granularity of material lithium carbonate as 74 μm and the granularity of calcium oxide as 61 μm, lithium oxide, calcium oxide and bismuth oxide are mixed in a molar ratio of 1:1.8:0.2, elliptical briquettes are prepared under a briquetting pressure of 45 MPa (each briquette is 35 g). The briquetted substance is charged into a φ330 mm*3, 300 mm industrial tube furnace with a vapor-deposited nitrocarbon compound crucible for thermal decomposition, wherein the thermal decomposition temperature is 880° C., the vacuum degree is 10 Pa, high temperature decomposition time is 5 h, and a thermal decomposition rate is 99.5%. The remaining preparation steps are the same as those in Embodiment 1; upon the test, the lithium purity is 99.991% in a commodity obtained by ingot casting after refining.

Comparative Example 1

1) An industrial grade lithium nitrate is roasted at a temperature of 680° C. for 7 h to form stable $Li_2O \cdot 2CaO$ without briquetting, wherein the decomposition rate of lithium nitrate decomposed into lithium oxide is 98.1%, and a lithium yield reaches 90.1%.

2) A unsaturated composite oxide formed by the lithium oxide obtained in step 1) and the refractory agent, a silicon iron and $CaF_2$ are respectively crushed and ball-milled till a granularity is 60 μm, mixed according to the mass ratio of 80:18:2, and pressed into briquettes at the weight of 28 g/Nr. under 35 Mpa.

3) The briquettes in step 2) are charged into a φ330 mm*3,300 mm industrial heat-resistant tube furnace with a vacuum degree of 3 pa and a temperature of 1,200° C. for vacuum reduction; at this time, a reduction product is in a gaseous state and carries solid materials, and a lithium reduction is 98.8%.

4) The gas carrying the solid materials passes through a centrifugal filter in a dust chamber in a temperature control device, and then through a first condensing chamber, wherein the first condensing chamber has a sandwich; and the temperatures of the centrifugal separator and the first condensing chamber are controlled to be 720° C. with the gas at an airflow velocity of 1.5 m/sec. The gas carrying 98% of more than 20 μm solid particles is removed while passing through the first condensing chamber, more than 99.95% of carried dust is purified when the gas passes through 0.5 μm micron ceramic filter, and an outlet temperature is controlled to be 660° C.

5) The purified pure metal gas passes through the second condensing chamber of the quenching device; when the temperature of an inner layer of a double-casing cooler of the second condensing chamber is controlled to be 550° C., a low temperature cooling liquid below −105° C. is thermally exchanged with the metal gas on an outer layer; heat is transferred to an inner wall from a center of the cooler by a gas at 3 m/sec, and the cooling area is 0.68 $dm^3$/kg, so that the metal gas may be rapidly condensed as the condensed phase of the alloy.

6) A lithium metal raw ingot having a purity being 99% is obtained by flux smelting and refining of the metal lithium in a condensed phase in a pit furnace under the protection of Ar and mixing.

7) The lithium metal raw ingot is separated by distillation; a lower temperature of a distiller is controlled to be 530° C., a middle temperature controlled to be 430° C., and an upper temperature controlled to be 60° C.; impurities with a high melting point are removed from a lower part, including Fe, Ni, Co, Si and Ca; metal impurities with a low melting point are removed from an upper part, including k, Na, and an Li metal cast ingot is discharged from a middle part.

A chemical component test (ICP test) is carried out for commodities obtained by ingot casting after distillation, and the chemical component test results of the lithium ingot are seen in the table below.

| Li | K | Na | Ca | Fe | Si | Al |
|---|---|---|---|---|---|---|
| 99.991 | 0.0004 | 0.0009 | 0.0005 | 0.0005 | 0.0005 | 0.0004 |
| Ni | Cu | Mg | Cl- | N | Pb | |
| 0.0004 | 0.0005 | 0.0005 | 0.0007 | 0.0032 | 0.0005 | |

Due to longer thermal decomposition time of lithium nitrate than lithium carbonate, oxynitride gases are produced during the decomposition, but are processed difficultly in an environmental protection process, so that the entire process is complicate. Direct thermal decomposition leads to low lithium yield and high energy consumption ratio. Compared with lithium carbonate, the metal lithium has a low capacity, a complicated process and a low yield, which leads to increasing production cost.

Comparative Example 2

1) An industrial grade lithium sulfate is roasted at the temperature of 920° C. for 8 h to form stable $Li_2O \cdot 1.75\ CaO$ without briquetting, wherein the decomposition rate of lithium sulfate decomposed into lithium oxide is 94.8%, and a yield of lithium reaches 95.6%.

2) The unsaturated composite oxide formed by the lithium oxide obtained in step 1) and the refractory agent, a silicon iron and $CaF_2$ are respectively crushed and ball-milled till a granularity is 60 μm, mixed according to the mass ratio of 82:16:2, and pressed into briquettes at a weight of 30 g/Nr. under 40 Mpa.

3) The briquettes in step 2) are charged into a φ330 mm*3,300 mm industrial heat-resistant tube furnace, with the vacuum degree of 3 pa and the temperature of 1,200° C. in the furnace; and at this time, a reduction product is in the gaseous state and carries solid materials, and a lithium reduction is 98.9%.

4) The gas carrying the solid materials passes through a centrifugal filter in a dust chamber and the first condensing chamber, wherein the first condensing chamber has a sandwich; and the temperatures of a centrifugal separator and the first condensing chamber are controlled to be 740° C. with the gas at an airflow velocity of 1.5 m/sec; the gas carrying 98% of more than 20 μm solid particles is removed while passing through the first condensing chamber, more than 99.95% of carried dust is purified when the gas passes through 0.5 μm micron ceramic filter, and an outlet temperature is controlled to be 670° C.

5) The pure metal gas passes through the second condensing chamber of the quenching device; when a temperature of an inner layer of a double-casing cooler of the second condensing chamber is controlled to be 65° C., a low temperature cooling liquid below −105° C. is thermally exchanged with the metal gas on an outer layer; heat is transferred to an inner wall from a center of the cooler by a gas at 3 m/sec, and the cooling area is 0.63 dm$^3$/kg, so that the metal gas may be rapidly condensed as the condensed phase of the alloy.

6) A lithium metal raw ingot having a purity being 99% is obtained by flux smelting and refining of the metal lithium in a condensed phase in a pit furnace under the protection of Ar.

7) The lithium metal raw ingot is separated by distillation; a lower temperature of a distiller is controlled to be 560° C., a middle temperature controlled to be 440° C., and an upper temperature controlled to be 75° C.; impurities with a high melting point are removed from a lower part, including Fe, Ni, Co, Si and Ca; metal impurities with a low melting point are removed from an upper part, including k, Na, and an Li metal cast ingot is discharged from a middle part.

A chemical component test (ICP test) is carried out for commodities obtained by ingot casting after distillation, and the chemical component test results of the lithium ingot are seen in the table below.

| Li | K | Na | Ca | Fe | Si | Al |
|---|---|---|---|---|---|---|
| 99.991 | 0.0004 | 0.0009 | 0.0005 | 0.0005 | 0.0005 | 0.0005 |
| Ni | Cu | Mg | Cl− | N | | Pb |
| 0.0005 | 0.0005 | 0.0005 | 0.0009 | 0.0028 | | 0.0005 |

Due to the fact that the lithium sulfate is decomposed more difficultly in comparison with lithium carbonate and cannot be completely decomposed, direct thermal decomposition will lead to low lithium yield, high energy consumption, long time, low reduction rate, low metal yield, complicated process, low yield and increasing production cost.

Through repeated verification, the impurity contents in the lithium metal are better than those specified in Standards GB/T4369-2015, Li-1 and Li-2.

Experiment 1

The same methods and steps in Embodiment 1 are used for experiment to determine influences on the form of the lithium in the condensed state that is finally prepared due to different temperatures within the first and second condensing chambers of the temperature control device and at an outlet of the first condensing chamber. These specific results are as follows:

| First condensing chamber (° C.) | Outlet of first condensing chamber (° C.) | Second condensing chamber (° C.) | Configuration | Test result |
|---|---|---|---|---|
| 850 | 750 | 90 | Fluffy, condensed metal | General |
| 750 | 680 | 70 | Condensed metal, easily collected | Good |
| 650 | 600 | 40 | Condensed metal, uneasily collected | Poor |

It can be seen from the tests that a condensed metal of the magnesium-lithium alloy, formed when a temperature of the first condensing chamber is 750° C. and a temperature of the second condensing chamber is 70° C., is the best and easily collected. When the temperatures of the first and second condensing chambers are high, the magnesium-lithium alloy is fluffy and has a general form. If the temperatures of the first and second condensing chambers are too low, the formed condensed metal is collected uneasily, and cannot form the briquettes.

Experiment 2

The same methods and steps in Embodiment 1 are used for experiment to determine the influences of different reduction temperatures and time, and different reduction vacuum degrees on the lithium reduction, as shown in the table below:

| Reduction temperature (° C.) | Reduction time (min) | Reduction vacuum degree (pa) | Li reduction rate (%) |
|---|---|---|---|
| 1000 | 600 | 3 | 61.1 |
| 1050 | 600 | 2 | 71.8 |
| 1100 | 600 | 4 | 81.6 |
| 1150 | 600 | 3 | 91.5 |
| 1200 | 600 | 2 | 99.3 | as can be seen from the table, the lithium reduction rate is better when the temperature is 1,200° C. and the reduction time is 10 h.

Those skilled in the art should be able to implement or use the present invention, after reading the description of the embodiments disclosed above. Various modifications to these embodiments will be obvious to those skilled in the art. The general principle defined herein can be implemented in other embodiments without departing from the spirit or scope of the present invention. Thus, the present invention will not be intended to be limited to these embodiments herein, and the broadest scope consistent with the principles and novel features disclosed herein shall prevail.

The invention claimed is:

1. A method for preparing a purified lithium, comprising:
   S1: mixing-raw material, a refractory agent, and a catalyst to form a first mixture and briquetting the first mixture, thermally decomposing the briquetted first mixture to form an unsaturated composite oxide comprising lithium oxide and the refractory agent, and recycling a sublimated and condensed catalyst;
   S2: mixing the unsaturated composite oxide, a reducing agent, and a fluxing agent to form a second mixture, and briquetting the second mixture;
   S3: reducing the briquetted second mixture in a vacuum reaction furnace to form a gaseous mixture containing solid particles;
   S4: passing the gaseous mixture sequentially through a centrifugal filter in a dust chamber of a temperature control device, a first condensing chamber, and a micron ceramic filter to remove more than 99.95% of the solid particles in the gaseous mixture to form a purified gas, wherein each of the centrifugal filter and the first condensing chamber has a temperature of 700-800° C. and a linear gas velocity of 1.2-1.8 m/sec, and a temperature of the purified gas is 650-700° C.;
   S5: cooling the purified gas using a cooling liquid at below −100° C. in a condenser in a second condensing chamber to a temperature of 50-80° C. to condense a condensed lithium from the purified gas to obtain a condensed lithium; and
   S6: subjecting the condensed lithium to one or more selected from flux smelting, refining, purifying by distillation under the protection of Ar to form the purified lithium,
   wherein the catalyst is selected from $Sb_2O_3$, $Bi_2O_3$, and mixtures thereof.

2. The method according to claim 1, wherein the lithium-containing raw material is selected from carbonate, nitrate, sulfate, silicate, and lithium-containing sulphide,
   the refractory agent is selected from CaO, $Al_2O_3$, and a mixture of CaO and $Al_2O_3$, and
   a molar ratio of the lithium-containing raw material to the refractory agent to the catalyst in the first mixture is 32-40:58-67:1-3.

3. The method according to claim 1, wherein S1 further comprises separately grounding the lithium-containing raw material, the refractory agent, and the catalyst to particles of 40-100 μm in a ball mill before mixing; and the first mixture is briquetted into briquettes of an almond shape at a weight of 25-35 grams per briquette under a pressure of 35-45 MPa, and
   the first briquetted mixture has a thermal decomposition temperature of 600-1,300° C., and a carbon content of 40 PPM or less.

4. The method according to claim 1, wherein S2 further comprises separately grounding the unsaturated composite oxide, the reducing agent, and the fluxing agent to particles of 40-100 μm, and the second mixture is briquetted into briquettes of an almond shape at a weight of 25-35 gram per briquette at 30-45 MPa.

5. The method according to claim 1, wherein the reducing agent is selected from silicon iron, an aluminium powder having an Al content being more than or equal to 99 wt %, an aluminium powder having an activity being more than 70 wt % and the granularity of less than 8 μm in particle size, and an aluminum silicon powder having an Al—Si content of more than or equal to 98%; the fluxing agent is $CaF_2$ having a purity of 97.5%; and a mass ratio of the unsaturated composite oxide to the reducing agent to the fluxing agent in the second mixture is 79-85:12-20:1-3.

6. The method according to claim 1, wherein the vacuum reaction furnace is at a vacuum of 10-20 pa and a temperature of 600-1300° C.

7. The method according to claim 1, wherein the vacuum reaction furnace is an industrial heat-resistant tube furnace being operated at a vacuum degree of 1-15 pa, a temperature of 800-1,300° C., and for a thermal reduction time of 6-12 h.

8. The method according to claim 1, further comprising ingot casting the purified lithium to obtain a lithium ingot having a purity of 99.0-99.99 wt %.

* * * * *